W. S. MOODY.
INDUCTION APPARATUS.
APPLICATION FILED MAR. 23, 1918.
1,280,806.
Patented Oct. 8, 1918.
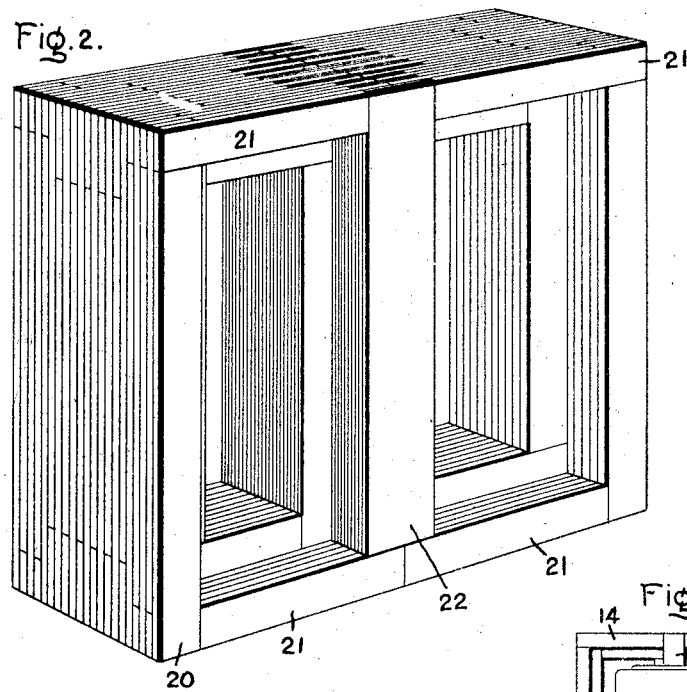
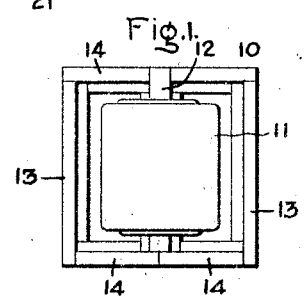
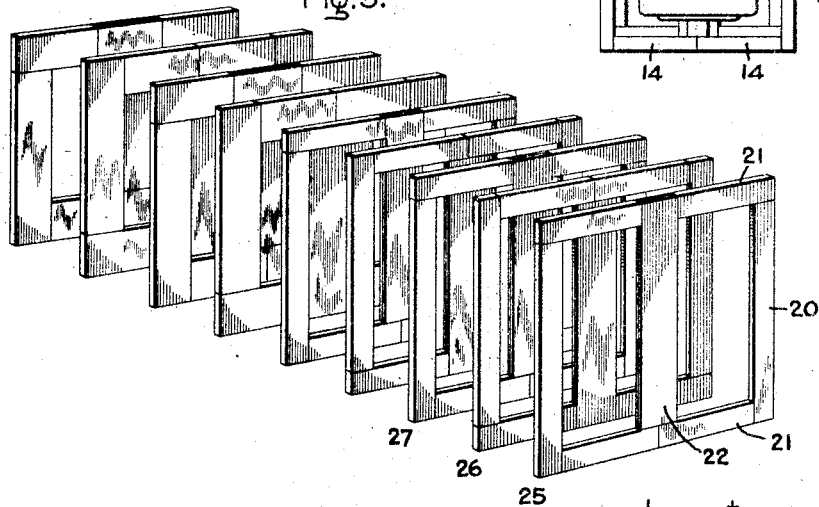
Inventor:
Walter S. Moody,
by *Albert G. Davis*
His Attorney.

UNITED STATES PATENT OFFICE.

WALTER S. MOODY, OF PITTSFIELD, MASSACHUSETTS, ASSIGNOR TO GENERAL ELECTRIC COMPANY, A CORPORATION OF NEW YORK.

INDUCTION APPARATUS.

1,280,806.  Specification of Letters Patent.  Patented Oct. 8, 1918.

Application filed March 23, 1918. Serial No. 224,140.

*To all whom it may concern:*

Be it known that I, WALTER S. MOODY, a citizen of the United States, residing at Pittsfield, county of Berkshire, State of Massachusetts, have invented certain new and useful Improvements in Induction Apparatus, of which the following is a specification.

My invention relates to stationary induction apparatus, for example, transformers, auto-transformers, some reactances, etc. An object of my invention is to provide an improved construction for such devices, in order especially, to simplify the assembly of the cores and to reduce the cost of the whole apparatus.

The cores, which provide the paths for the magnetic flux of stationary induction apparatus, are very commonly made up of thin layers of laminations in order to reduce the operating losses therein and the heating thereof. According to the prior practice, the cores of electrical apparatus are generally made up of laminations of one of two thicknesses, either of laminations of about 14 mils (fourteen one-thousandths of an inch) or of laminations of 28 mils (twenty-eight one-thousandths of an inch) thickness. In general, the thinner the laminations, the lower are the operating losses and the heating, but correspondingly the higher the cost of construction. I have found, however, that the present usual practice of employing laminations of the same thickness throughout the whole of each core, is an unnecessary refinement as it were, and that greater losses may be permitted in the parts of the cores subject to better ventilation, particularly those parts of the cores not surrounded by the windings, in order to simplify the construction and reduce the cost of the apparatus. I find that the thinner laminations are desirable in the parts of the cores where the ventilation is not so good or is secured at some sacrifice in other directions, especially within the windings, in order to keep the operating losses low in such parts, but that laminations thicker than have been used in many instances, are suitable for the better or more easily ventilated parts of the core. According to my invention, therefore, the more poorly ventilated parts of the cores are made up of thinner laminations than the better ventilated parts thereof. In order to most simplify the construction, and generally to restrict the formation of complete electrical circuits within the mass of the core and transverse to the path of the magnetic flux, the thicknesses of the heavier laminations are preferably multiples of the thicknesses of the thinner laminations adjacent thereto. In cores of interleaved laminations it is desirable (for economy in construction and at the same time low operating losses) to interleave the laminations in groups of not more than two of the thinner (or thinnest) laminations per group; correspondingly, in such cores it is preferable that the thickness of each of the thicker laminations be double the thickness of each of the adjacent thinner laminations. Correspondingly, or further, it is preferable in carrying out my invention, to use 14 mil laminations for the parts of the cores surrounded by the windings and 28 mil laminations for the outer parts of the core, material of these thicknesses being now common and more easily obtained.

It will be noticed that the aplication of my invention may result in increasing the total operating losses in the core if the other details of the apparatus are unchanged. In some cases this increase in the operating losses will be permissible. Where such increase is not allowable it may be nullified by decreasing the density of the magnetic flux in the core, for example, by increasing the cross area of the core, or otherwise, as will be understood.

In the accompanying drawings and the following description I have illustrated and described one of the best embodiments of my invention of which I am now aware; in order to better illustrate the invention, I have shown the laminations very much thicker, relatively, than are those employed in practice. Figure 1 is an elevation of a stationary induction apparatus embodying, or suitable for the embodiment of, my invention. Fig. 2 is a perspective view of the core of the apparatus of Fig. 1. Fig. 3 is a perspective view of a number of adjacent layers of the core of Fig. 2, the layers being shown separated to more clearly illustrate my invention.

In Fig. 1 the core 10 has windings 11 surrounding an inner portion or winding leg 12 of the core. Outer portions 13 and 14, respectively outer legs and yokes, complete the magnetic circuit through the winding leg 12. This Fig. 1 illustrates diagrammatically any stationary induction apparatus.

The core of the apparatus of Fig. 1 is more clearly illustrated in Figs. 2 and 3. The winding leg 12 of this core is of the cruciform type, the outer legs and yokes being of the semi-cruciform type. It may be observed from Fig. 2, and, better, from Fig. 3, that the yokes and outer legs are made up of laminations each of which is a multiple of twice the thickness of one of the laminations of the winding leg. Thus the outer leg laminations 20 and the yoke laminations 21 are, each, twice as thick as one of the inner leg laminations 22. The laminations are interleaved, two laminations 22, side by side, coöperating at each joint with one thicker yoke lamination 21; at the outer joints at the yoke laminations 21, laminations 20 of the same thickness as 21 coöperate therewith. Since the laminations 20 and 21 are twice the thickness of each of the laminations 22 two of the thinner laminations 22 are readily assembled opposite and adjacent one of the thicker laminations 21, the layers of laminations are readily interleaved, and the chances of forming an electrical circuit across a considerable part of the core by overlapping the edges of the laminations, is minimized. The interleaving of the laminations is clearly shown in Fig. 3; compare the dispositions of the laminations in the layers 25, 26 and 27.

Thus it clearly appears that parts of the core which are generally both more easily ventilated and better ventilated, that is, the yokes 14 and the outer legs 13, are composed of thicker laminations than are employed in the portion or portions of the core, namely in this case, the winding leg 12, which is generally both more poorly ventilated and where the ventilation is secured at some sacrifice of the materials and arrangement of the windings 11. Thus also the operating losses are minimized in the portion 12 of the core where the heat thereof is gotten rid of only with difficulty, and where the heat is gotten rid of more easily, that is, in the portions 13 and 14, the operating losses are allowed to assume greater values in order that the construction may be simplified and cheapened.

While I have described the principle of my invention and the best mode I have contemplated for applying this principle, other modifications will occur to those skilled in this art and I aim in the appended claims to cover all modifications which do not involve a departure from the spirit and scope of my invention.

What I claim as new and desire to secure by Letters Patent of the United States, is:—

1. Stationary induction apparatus comprising a laminated core of magnetic material and a winding surrounding a portion thereof, the thickness of each of a plurality of laminations of a portion of the core outside the winding being a multiple of the thickness of each of the coöperating laminations within said winding.

2. Stationary induction apparatus comprising a winding and a core therefor, said core comprising laminations providing a winding leg carrying said winding and other laminations interleaved therewith providing an outer leg completing the magnetic circuit, the thickness of each of a plurality of laminations of said outer leg being twice the thickness of each of the coöperating laminations of the winding leg and said laminations of the winding leg being interleaved in groups of two with the laminations of the outer leg.

3. Stationary induction apparatus comprising a winding and a core therefor, said core comprising laminations providing a winding leg carrying said winding and other laminations interleaved therewith providing a part of the core outside said winding, the thickness of each of a plurality of laminations of said outer core part being twice the thickness of each of the coöperating laminations of the winding leg and said laminations of the winding leg being interleaved in groups of two with said laminations of the outer core part.

4. Stationary induction apparatus comprising a laminated core of magnetic material and a winding surrounding a portion thereof, each of a plurality of laminations of a portion of the core outside the winding being thicker than each of a plurality of laminations within said winding.

5. Stationary induction apparatus comprising a laminated core of magnetic material and a winding surrounding a portion thereof, each of a plurality of laminations of a portion of the core being thicker than each of the laminations coöperating therewith to extend the magnetic circuit.

6. Stationary induction apparatus comprising a laminated core of magnetic material and a winding surrounding a portion thereof, a plurality of thicker laminations comprising a better ventilated portion of the core and a plurality of thinner laminations comprising a portion of the core more poorly ventilated.

In witness whereof, I have hereunto set my hand this fourteenth day of March, 1918.

WALTER S. MOODY.